United States Patent [19]

Weber et al.

[11] Patent Number: 4,840,976

[45] Date of Patent: Jun. 20, 1989

[54] PRODUCTION OF CLOSED-CELLED FOAMS OF HIGH COMPRESSIVE STRENGTH

[75] Inventors: Reinhold Weber, Mutterstadt; Ludwig Zuern, Bad Durkheim; Manfred Weilbacher, Frankenthal, all of Fed. Rep. of Germany

[73] Assignee: BASF Aktiengesellschaft, Ludwigshafen, Fed. Rep. of Germany

[21] Appl. No.: 216,348

[22] Filed: Jul. 8, 1988

[30] Foreign Application Priority Data

Jul. 15, 1987 [DE] Fed. Rep. of Germany ....... 3723301

[51] Int. Cl.$^4$ .............................. C08J 9/08; C08J 9/14
[52] U.S. Cl. ......................................... 521/79; 264/50; 264/51; 264/53; 264/DIG. 5; 521/97; 521/98; 521/146; 521/910
[58] Field of Search ............... 264/50, 51, 53, DIG. 5; 521/79, 97, 98, 910

[56] References Cited

U.S. PATENT DOCUMENTS

| | | | |
|---|---|---|---|
| 3,960,792 | 6/1976 | Nakamura | 521/79 |
| 4,303,758 | 12/1981 | Gusmer | 264/53 |
| 4,370,286 | 1/1983 | Nehmey et al. | 264/53 |
| 4,393,017 | 7/1983 | Kim et al. | 264/211.21 |
| 4,396,563 | 8/1983 | Gusmer | 264/53 |
| 4,636,527 | 1/1987 | Suh et al. | 521/79 |

*Primary Examiner*—Morton Foelak
*Attorney, Agent, or Firm*—Oblon, Fisher, Spivak, McClelland & Maier

[57] ABSTRACT

Closed-celled foams of high compressive strength are obtained by extruding a mixture of a styrene polymer and from 8 to 16% by weight of a blowing agent mixture containing from 2 to 20% by weight of ethyl chloride, from 2 to 20% by weight of carbon dioxide, from 20 to 80% by weight of dichlorodifluoromethane and from 10 to 60% by weight of monochlorodifluoromethane.

1 Claim, No Drawings

PRODUCTION OF CLOSED-CELLED FOAMS OF HIGH COMPRESSIVE STRENGTH

The present invention relates to a process for producing a closed-celled foam of high compressive strength by extruding a mixture of a styrene polymer, a blowing agent and, optionally, customary additives.

The art of producing foams based on styrene polymers knows a large number of blowing agents. Preference is given to using methyl chloride. Its toxicity, however, necessitates extreme precautions not only in the production but also in the subsequent storage of the foam. In addition, the foam shows considerable shrinkage at elevated temperatures. If chlorofluorocarbons, such as dichlorodifluoromethane, are used as blowing agents, the foams obtained dilate at elevated temperatures. It is true that mixtures of substantially equal parts of methyl chloride and dichlorodifluoromethane lead to dimensionally stable foams, but the toxicity of the methyl chloride prohibits their use. If methyl chloride is replaced by the significantly less toxic ethyl chloride, the result is a relatively flexible foam of insufficient compressive strength. Even carbon dioxide has already been recommended as a blowing agent. However, its use leads to open-celled foams which show high water absorption.

It is an object of the present invention to provide a process for producing foams from styrene polymers without using toxic blowing agents which leads to closed-celled foams which show only little water absorption, which are dimensionally stable and which possess high compressive strength and heat distortion resistance. It is a further object of the present invention to reduce the dichlorodifluoromethane content in the foam, since, released into the atmosphere, this substance is alleged to reduce the sun screen effect of the ozone layer.

We have found that these objects are achieved with the use of a blowing agent mixture containing from 2 to 20% by weight of ethylene chloride, from 2 to 20% by weight of carbon dioxide, from 20 to 80% by weight of dichlorodifluoromethane and from 10 to 60% by weight of monochlorodifluoromethane.

The present invention accordingly provides a process for producing a closed-cell foam of high compressive strength by extruding a mixture of a styrene polymer and from 8 to 16% by weight, based on the styrene polymer, of a blowing agent and also, optionally, customary additives, which comprises using as the blowing agent a mixture containing (a) from 2 to 20% by weight of ethyl chloride,
(b) from 2 to 20% by weight of carbon dioxide,
(c) from 20 to 80% by weight of dichlorodifluoromethane and
(d) from 10 to 60% by weight of monochlorodifluoromethane.

For the purposes of the present invention, styrene polymers are polystyrene and copolymers of styrene containing not less than 50% by weight of styrene as copolymerized units. Suitable comonomers are for example α-methylstyrene, ring-halogenated styrenes, ring-alkylated styrenes, acrylonitrile, esters of (meth)acrylic acid with alcohols of from 1 to 8 carbon atoms, N-vinyl compounds, such as vinylcarbazole, maleic anhydride or else small amounts of compounds containing two polymerizable double bonds, such as butadiene, divinylbenzene or butanediol diacrylate.

The blowing agent is used in an amount of from 8 to 16% by weight, preferably from 10 to 14% by weight, based on the styrene polymer. It contains from 2 to 20% by weight, preferably from 5 to 15% by weight, of ethyl chloride, from 2 to 20% by weight, preferably from 5 to 15% by weight, of carbon dioxide, from 20 to 80% by weight, preferably from 40 to 60% by weight, of dichlorodifluoromethane and from 10 to 60% by weight, preferably from 20 to 40% by weight, of monochlorodifluoromethane. The most suitable composition is readily determinable in preliminary trials. If the ethyl chloride content in the blowing agent mixture is raised to above 20% by weight, the foam becomes more flexible and its compressive strength is unsatisfactory. If the carbon dioxide content in the blowing agent mixture is raised to above 20%, the proportion of open cells increases considerably and the water absorption of the foam goes up. If the dichlorodifluoromethane content is raised to above 80% by weight, the dimensional stability of the foam at elevated temperatures is unsatisfactory. If the monochlorodifluoromethane content in the mixture is raised to above 60%, the foam gives unsatisfactory thermal insulation on aging.

The customary additives addable to the styrene polymer/blowing agent mixture in customary amounts comprise antistats, stabilizers, dyes, lubricants, fillers, flameproofing agents and/or nucleating agents.

The foams are produced according to the invention in a conventional manner, by extrusion. In an extruder, the heat-plasticized styrene polymer is intimately mixed with the blowing agent mixture and the additives. The mixture then passes through a relaxation zone where it is cooled to from about 100° to 120° C. with uninterrupted stirring and is then extruded through a die into sheets.

The invention is illustrated by the Examples which follow. Parts are by weight.

EXAMPLES 1 TO 7 AND COMPARATIVE EXAMPLES 8 AND 9

100 parts of polystyrene having a melt flow index of 5.0, 1.5 parts of hexabromocyclododecane as flameproofing agent and 1 part of talc as cell size regulant were continuously fed into an extruder having an inner screw diameter of 120 mm. At the same time a blowing agent mixture comprising 6 parts of dichlorodifluoromethane, 1 part of $CO_2$, 3 parts of chlorodifluoromethane and 1 part of chloroethane was continuously injected into the extruder through an inlet opening therein. After a delay time of 15 minutes the uniformly kneaded gel in the extruder was cooled to an exit temperature of 105° C. and extruded into the open through a die 300 mm in length and 1.5 mm in width. The foam was passed through a molding channel attached to the extruder, producing a foamed polystryene sheet 650 mm × 50 mm in cross-section. The foamed product was cut into pieces 600 mm × 50 in cross-section and 1,250 mm in length. The samples were tested after 30 days' storage. The λ value indicated in Table 1 was determined after 2 years' storage. The other Examples were always run under the same conditions, the only variable factor being the blowing agent mixture specified for each Example in Table 1.

The parameters measured were the λ value (heat conductivity number) according to German Standard Specification DIN No. 52,612, the foam density according to German Standard Specification DIN No. 53,420, the cell size according to ASTM D 3842-69, the proportion of closed cells according to DIN-ISO No. 4,590, the water absorption of whole sheets according to German Standard Specification DIN No. 53,434, the compressive strength according to German Standard Specification No. 53,421 and the dimensional stability according to German Standard Specification DIN No. 52,431.

TABLE 1

| Example | Blowing agent quantity % by weight | $CCl_2F_2$ % by weight | $CO_2$ % by weight | $CHClF_2$ % by weight | $C_2H_5Cl$ % by weight | Heat conductivity number $\lambda$ value [W/m.K] |
|---|---|---|---|---|---|---|
| 1 | 11 | 6 | 1 | 3 | 1 | 0.0285 |
| 2 | 8 | 2 | 1.5 | 3 | 1.5 | 0.0395 |
| 3 | 13 | 2.7 | 0.5 | 7.8 | 2.0 | 0.0345 |
| 4 | 16 | 12.8 | 0.5 | 1.7 | 1.0 | 0.0254 |
| 5 | 10 | 4.7 | 1.5 | 3.0 | 0.8 | 0.0310 |
| 6 | 12 | 6.5 | 1.0 | 4.0 | 0.5 | 0.0290 |
| 7 | 9 | 1.8 | 0.9 | 5.4 | 0.9 | 0.0390 |
| 8 (comparison) | 10 | 1.5 | 1.0 | 4.0 | 3.5 | 0.0394 |
| 9 (comparison) | 16 | 12.8 | 0.5 | 2.7 | 0 | 0.0294 |

| Example | Foam density g/l | Cell size mm | Closed cells % | Water absorption % by volume | Compressive strength [N/mm$^2$] | Dimensional stabiltiy in % | | |
|---|---|---|---|---|---|---|---|---|
| | | | | | | Length | Width | Thickness |
| 1 | 34.7 | 0.21 | 98.5 | 0.09 | 0.284 | +1 | −0.3 | −0.1 |
| 2 | 32.8 | 0.37 | 93.0 | 0.14 | 0.196 | 0 | −3 | −2 |
| 3 | 33.6 | 0.23 | 96.5 | 0.09 | 0.230 | +1.2 | −0.1 | −0.3 |
| 4 | 37.4 | 0.15 | 99.0 | 0.07 | 0.375 | +5 | +4.8 | +4 |
| 5 | 35.0 | 0.25 | 95.6 | 0.11 | 0.270 | −0.3 | −2 | −1 |
| 6 | 35.2 | 0.23 | 97.7 | 0.09 | 0.290 | +1 | +0.3 | +0.2 |
| 7 | 33.1 | 0.32 | 97.2 | 0.10 | 0.227 | +3 | +2 | −3.5 |
| 8 | 32.0 | 0.22 | 93.5 | 0.16 | 0.210 | +7 | −4 | −2 |
| 9 | 36.4 | 0.12 | 98.7 | 0.07 | 0.354 | +8.5 | −7 | +5 |

We claim:

1. A process for producing a closed-celled foam of high compressive strength by extruding a mixture of a styrene polymer and from 8 to 16% by weight, based on the styrene polymer, of a blowing agent and also, optionally, customary additives, which comprises using as the blowing agent a mixture containing
   (a) from 2 to 20% by weight of ethyl chloride,
   (b) from 2 to 20% by weight of carbon dioxide,
   (c) from 20 to 80% by weight of dichlorodifluoromethane and
   (d) from 10 to 60% by weight of monochlorodifluoromethane.

* * * * *